A. SCHLOPMAN.
ANTISKIDDING DEVICE.
APPLICATION FILED AUG. 18, 1916.
1,221,226. Patented Apr. 3, 1917.
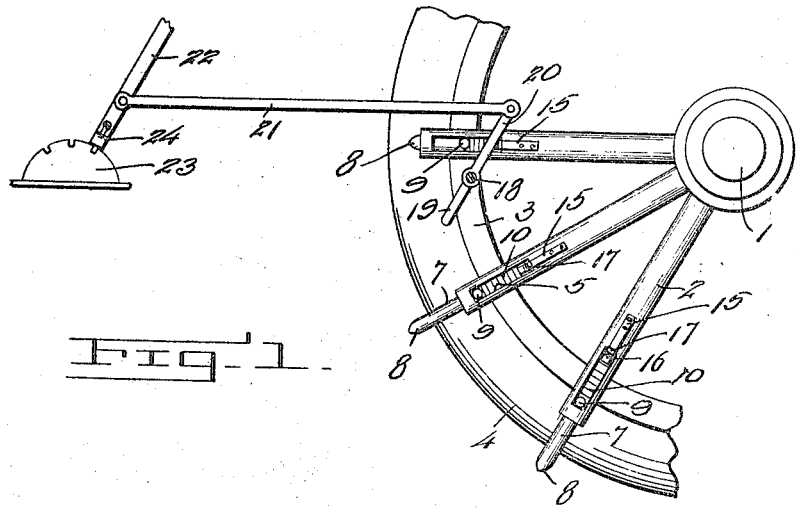
Fig. 1.
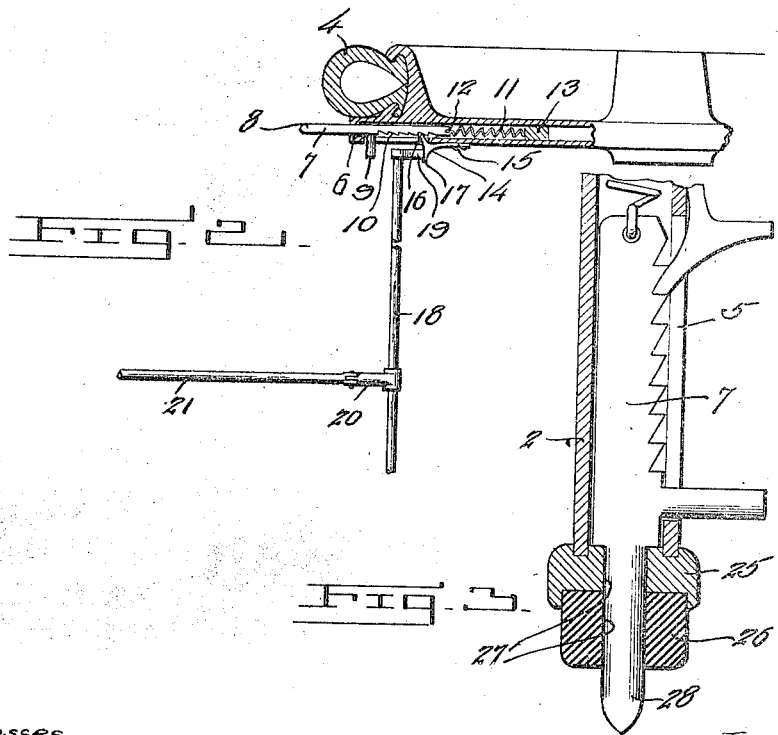
Fig. 2.
Fig. 3.
Witnesses
Inventor,
Anton Schlopman
By
Attorney.

UNITED STATES PATENT OFFICE.

ANTON SCHLOPMAN, OF GLADSTONE, NORTH DAKOTA.

ANTISKIDDING DEVICE.

1,221,226. Specification of Letters Patent. Patented Apr. 3, 1917.

Application filed August 18, 1916. Serial No. 115,732.

*To all whom it may concern:*

Be it known that I, ANTON SCHLOPMAN, a citizen of the United States, residing at Gladstone, in the county of Shark and State of North Dakota, have invented certain new and useful Improvements in Antiskidding Devices, of which the following is a specification.

This invention relates broadly to vehicle wheels and more particularly has reference to an anti-skidding vehicle wheel.

Among the aims and objects of the invention may be recited, the provision of a device of the character mentioned with a view of compactness, and in which the number of parts are few, the construction simple, the cost of production small, and the efficiency and operation high.

The invention includes novel non-skidding members arranged in the spokes of the wheel and having means in connection therewith for holding the members in either an advanced operative position or a retracted inoperative position.

Still further the invention embraces means mounted on the vehicle to which the wheels are connected for use in connection with the holding means of the non-skidding members whereby the holding means will be operated to permit of the automatic return of the non-skidding members or to permit of the advancement of the non-skidding members.

As a more specific feature the invention includes resilient means for returning the non-skidding members to a retracted inoperative position.

Other and further improvements and novel details in the construction and arrangement of parts will be apparent from the description to follow which for a clear understanding of the invention should be considered in connection with the accompanying drawings, forming a part hereof wherein the preferred embodiments of the invention are shown for the purpose of illustration.

In the drawings:—

Figure 1 is a fragmental front elevation of my invention.

Fig. 2 is a top plan of Fig. 1 a portion of the invention being shown in transverse section.

Fig. 3 is an enlarged fragmentary vertical section of a modified form of my invention, parts being shown in elevation.

With more particular reference to the drawings wherein like reference numerals refer to corresponding parts throughout the several views, I provide a wheel consisting of a hub 1 from which radiate hollow spokes 2 carrying laterally of and adjacent outer ends a rim 3 which may and preferably does receive a pneumatic tire 4. Each of the spokes is provided adjacent the outer end and at a point diametrically opposite the point of juncture with the rim, with a longitudinal slot 5. Slidably mounted in opening 6 in the closed outer end of each of the spokes 2 is a non-skidding member 7 the outer end of each of which terminates in a point 8. Stop lugs 9 extend laterally from each of the members 7 and are slidably arranged in the slots 5 for a purpose to be hereinafter described while the bars are also provided with a plurality of teeth 10 arranged in registration with the slots also for a purpose to be described.

In order to automatically return the members to a closed or retracted position after they have been released, I have provided my improved resilient means which in the present instance consists of helical springs 11 one end of each of which is connected at 12 to the inner end of one of the members 7 while the opposite end is rigidly connected to a block 13 and rigidly mounted within each of the spokes as illustrated in Fig. 2 of the accompanying drawings.

For the purpose of holding the non-skidding members in an advanced position, I have provided my improved retaining elements 14 which may and preferably are constructed in a substantially T-shaped configuration. The shank 15 of each of which is rigidly connected to one of the spokes 2 while one of the arms 16 projects through the slot 5 and engages the teeth 10 while the other arm 17 projects laterally of the spokes for a purpose to be described. In order to advance each of the points or in order to release the retaining means to permit of the automatic return of each of the points to a retracted position, I have provided my improved operating means. In the present instance I provide a rockably mounted shaft 18 adapted to be connected on the body of the vehicle. A lever 19 is mounted on the outer end of the shaft and when it is desired to advance the points the lever is properly adjusted and is engageable by the lugs 9 as the wheel revolves. When the shaft is locked in a reverse direction it will be successfully engaged by all of the arms 17 and thus force the retaining elements out of engagement with the teeth and allow the springs to act so as to automatically retract the members. Another arm 20 extends from the shaft having a connecting rod 21 pivotally connected thereto. The opposite end of the connecting rod is pivotally mounted on a hand actuating lever 22 pivotally mounted on a segmental rack 23 adapted to be suitably mounted on a vehicle within easy reach of the operator thereof. A suitable pawl mechanism 24 may be provided for maintaining the lever 22 in various adjusted positions with respect to the segmental rack 23.

In Fig. 3 of the accompanying drawings I have provided a modified form of this invention and it consists of connecting a wheel rim 25 to the outer ends of the spokes 2. This rim carries a solid rubber tire 26 while both the rim 25 and the tire 26 are provided with a plurality of uniformly spaced alternating and radially arranged openings 27 for slidably accommodating the reduced pointed end 28 of the non-skidding members 7. The remaining parts of the invention are constructed the same as heretofore set forth while the operation thereof is substantially the same. It will be noted however that this form is desirable for use in connection with vehicles using solid tires such as trucks.

The operation of this invention is as follows:

If it is desired to advance each of the non-skidding members 7 the lever 22 is moved rearwardly causing the arm 19 to move forwardly to be struck by each of the lugs 9 as the wheel revolves, and thus advance the lugs toward the outer end of the casing against the tension of the coil spring 11. In placing the members in an inoperative or retracted position it is only necessary to shift the lever to move the arm 19 into the path of the arms 17 of the retaining elements 14, thus upon the rotation of the wheel the arms 17 will be struck and the arms 16 drawn out of engagement with the teeth 10 on the bar 7 thereby allowing the springs 11 to exert their tension on the members and draw them into a retracted position.

From the above description taken in connection with the accompanying drawings it will be readily appreciated that I have provided an efficient non-skidding wheel and it is desired that special emphasis be laid upon the adjustable non-skidding members as well as the means for advancing and retracting these members.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

1. A non-skidding wheel including a hub, hollow spokes extending radially therefrom, a rim connected to the spokes, non-skidding members arranged within the spokes, means for holding the members in an advanced position beyond the periphery of the rim, means for advancing and releasing the members, and means for automatically returning the members to a retracted position after being released.

2. A non-skidding wheel including a hub, spokes extending radially therefrom, a rim connected to the spokes, non-skidding members slidably mounted with respect to the spokes, projections on each of the non-skidding members, retaining means on the spokes for removably holding the members in an adjusted position, means engageable with the projections to advance the members and engageable with the retaining means to release the members, and means for automatically retracting the members subsequent to the release thereof.

3. A non-skidding wheel including a hub, hollow spokes extending radially therefrom, a pneumatic tire receiving rim carried laterally of the outer ends of the spokes, non-skidding members slidably mounted in each of the spokes and when advanced adapted to extend beyond the periphery of the tire on the rim, lugs projecting from the members and through the slots in the rim, retaining elements carried by each of the spokes for engagement with the members to hold them in adjustable position, means engageable with the lugs to advance the members and engageable with the retaining elements to release the members, and resilient means in the spokes for drawing the members into a retracted position when released.

In testimony whereof I affix my signature in presence of two witnesses.

ANTON SCHLOPMAN.

Witnesses:
   H. C. BERRY,
   FLORENCE BAIRD.